(12) United States Patent
Ohnishi et al.

(10) Patent No.: US 11,205,919 B2
(45) Date of Patent: Dec. 21, 2021

(54) UNINTERRUPTIBLE POWER SUPPLY SYSTEM

(71) Applicant: TOSHIBA MITSUBISHI-ELECTRIC INDUSTRIAL SYSTEMS CORPORATION, Chuo-ku (JP)

(72) Inventors: Keisuke Ohnishi, Chuo-ku (JP); Shoichi Abe, Chuo-ku (JP); Fumihiko Inoue, Chuo-ku (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 114 days.

(21) Appl. No.: 15/758,557

(22) PCT Filed: Sep. 30, 2015

(86) PCT No.: PCT/JP2015/077652
§ 371 (c)(1),
(2) Date: Mar. 8, 2018

(87) PCT Pub. No.: WO2017/056209
PCT Pub. Date: Apr. 6, 2017

(65) Prior Publication Data
US 2018/0262045 A1 Sep. 13, 2018

(51) Int. Cl.
*H02J 9/06* (2006.01)
*H02M 5/458* (2006.01)
(Continued)

(52) U.S. Cl.
CPC ............ *H02J 9/06* (2013.01); *H02J 9/062* (2013.01); *H02M 5/4585* (2013.01); *H02M 7/537* (2013.01); *H02M 7/003* (2013.01)

(58) Field of Classification Search
CPC .......... H02J 9/06; H02M 7/003; H02M 7/537; H02M 5/4585
See application file for complete search history.

(56) References Cited

U.S. PATENT DOCUMENTS 9,876,438 B2 * 1/2018 Kato ................. H02M 1/36
2011/0134672 A1 * 6/2011 Sato .................. H02M 5/4585
363/126
(Continued)

FOREIGN PATENT DOCUMENTS

CN     1118951 A    3/1996
CN   102132480 A    7/2011
(Continued)

OTHER PUBLICATIONS

Office Action dated Oct. 9, 2018 in Japanese Patent Application No. 2017-542570 (with English translation), 6 pages.
(Continued)

*Primary Examiner* — Daniel Kessie
(74) *Attorney, Agent, or Firm* — Oblon, McClelland, Maier & Neustadt, L.L.P.

(57) ABSTRACT

In this uninterruptible power supply system, a first converter (2) for generating a DC voltage and a second converter (5) for regenerating power are separately provided. DC buses (L1 to L3) are connected to the second converter (5) and to a bidirectional chopper (6) with bus bars (B1 to B3). The bus bars (B1 to B3) are formed into a laminated bus bar (24). First semiconductor modules (M1*d*, M2*d*) included in the second converter (5) and second semiconductor modules (M1*a* to M1*c*, M2*a* to M2*c*) included in the bidirectional chopper (6) are each mounted on the laminated bus bar (24) and connected to the bus bars (B1 to B3). The bus bars (B1 to B3) and the first and second semiconductor modules (M1*a* to M1*d*, M2*a* to M2*d*) are configured as an integrated converter unit (7).

6 Claims, 9 Drawing Sheets

(51) Int. Cl.
*H02M 7/537* (2006.01)
*H02M 7/00* (2006.01)

(56) References Cited

U.S. PATENT DOCUMENTS

| | | | | |
|---|---|---|---|---|
| 2013/0113411 | A1* | 5/2013 | Suzuki | H02P 3/18 |
| | | | | 318/681 |
| 2013/0181519 | A1* | 7/2013 | Lee | H02J 3/46 |
| | | | | 307/24 |
| 2016/0079744 | A1* | 3/2016 | Nagasawa | H05K 7/1432 |
| | | | | 361/699 |
| 2016/0294301 | A1* | 10/2016 | Yokoyama | H05K 7/20927 |
| 2017/0070158 | A1* | 3/2017 | Kato | H02M 1/32 |
| 2017/0302190 | A1* | 10/2017 | Ikarashi | H03K 5/24 |

FOREIGN PATENT DOCUMENTS

| | | |
|---|---|---|
| JP | 4-305172 A | 10/1992 |
| JP | 8-182345 A | 7/1996 |
| JP | 2012-75274 A | 4/2012 |
| JP | 2012-119269 A | 6/2012 |
| JP | 2014-73033 A | 4/2014 |
| JP | 2015-5573 A | 1/2015 |

OTHER PUBLICATIONS

International Search Report dated Dec. 28, 2015 in PCT/JP2015/077652 filed Sep. 30, 2015.
Korean Office Action dated Sep. 25, 2019, in Patent Application No. 10-2018-7010941, 6 pages (with unedited computer generated English translation).
Combined Chinese Office Action and Search Report dated Jul. 25, 2019, in Patent Application No. 201580083482.4, 16 pages (with unedited computer generated English translation and English Translation of Category of Cited Documents).
Office Action dated Dec. 30, 2019 in corresponding Indian Patent Application No. 201817015376 (with English Translation), 5 pages.
Chinese Office Action dated Mar. 5, 2020, in Patent Application No. 201580083482.4, 13 pages (with unedited computer generated English translation).
Canadian Office Action dated Apr. 9, 2020, in Patent Application No. 2,998,832, 4 pages.
Office Action dated Mar. 12, 2021, in Canadian Application No. 2,998,832.
Korean Office Action dated Jun. 5, 2019, in Patent Application No. 10-2018-7010941, 8 pages (with unedited computer generated English translation).

* cited by examiner

UNINTERRUPTIBLE POWER SUPPLY SYSTEM

TECHNICAL FIELD

The present invention relates to an uninterruptible power supply system, and more particularly to an uninterruptible power supply system that converts a DC voltage of a power storage device into an AC voltage and supplies the AC voltage to a load during a power failure time.

BACKGROUND ART

An uninterruptible power supply system conventionally includes a converter, an inverter, and a bidirectional chopper. During a normal time when an AC voltage is supplied from an AC power source, the AC voltage from the AC power source is converted into a DC voltage by a converter, so that the DC voltage is supplied to a power storage device by the bidirectional chopper and is also converted into an AC voltage by the inverter to be supplied to a load. During a power failure time when supply of an AC voltage from the AC power source is stopped, a DC voltage of the power storage device is supplied to the inverter through the bidirectional chopper, so that the DC voltage is converted into an AC voltage to be supplied to a load.

Japanese Patent Laying-Open No. 2014-73033 (PTD 1) discloses a power conversion system including a rectifier diode, an inverter, and a regenerative converter. An AC voltage supplied from an AC power source is converted into a DC voltage by the rectifier diode, and the DC voltage is converted into an AC voltage by the inverter to be supplied to an induction motor. Regenerative power generated at the induction motor is converted into a DC voltage by the inverter. If the DC voltage exceeds an upper limit, the DC voltage is converted into an AC voltage by the regenerative converter to be returned to the AC power source.

CITATION LIST

Patent Document

PTD 1: Japanese Patent Laying-Open No. 2014-73033

SUMMARY OF INVENTION

Technical Problem

A converter of a conventional uninterruptible power supply system functions to convert an AC voltage into a DC voltage to supply the DC voltage to an inverter, and functions to convert a DC voltage into an AC voltage to return the AC voltage to an AC power source if the DC voltage gets excessively large due to regenerative power generated at a load. This makes the control of the converter complicated.

In view of this, it could be possible to replace a converter of an uninterruptible power supply system with the rectifier diode and the regenerative converter of PTD 1 so as to simplify the control of the converter. Replacing a converter of an uninterruptible power supply system with the rectifier diode and the regenerative converter, however, disadvantageously leads to increase in size of the system.

Accordingly, a main object of the present invention is to provide an uninterruptible power supply system that can achieve simplification of the control and reduction in size of the system.

Solution to Problem

An uninterruptible power supply system according to the present invention includes: a first converter configured to convert an AC voltage supplied from an AC power source into a DC voltage; an inverter configured to convert a DC voltage into an AC voltage and supply the AC voltage to a load; a DC bus connected between the first converter and the inverter and configured to transmit a DC voltage; a bus bar connected to the DC bus and configured to transmit a DC voltage; a second converter connected to the bus bar and configured to, if a DC voltage of the DC bus exceeds an upper limit, convert a DC voltage received from the bus bar into an AC voltage and return the AC voltage to the AC power source; a bidirectional chopper connected to the bus bar and configured to supply a DC voltage received from the bus bar to a power storage device during a normal time when an AC voltage is supplied from the AC power source, and supply a DC voltage of the power storage device to the inverter through the bus bar during a power failure time when supply of an AC voltage from the AC power source is stopped; and a circuit board including the bus bar. The second converter includes a first semiconductor device. The bidirectional chopper includes a second semiconductor device and a reactor. Each of the first and second semiconductor devices is mounted on the circuit board and connected to the bus bar.

Advantageous Effects of Invention

In an uninterruptible power supply system according to the present invention, a first converter for generating a DC voltage and a second converter for regenerating power are separately provided, thus achieving simplification of the control. Further, a DC bus is connected to the second converter and to a bidirectional chopper with a bus bar, a circuit board including the bus bar is provided, and a first semiconductor device of the second converter and a second semiconductor device of the bidirectional chopper are each mounted on the circuit board and connected to the bus bar. Accordingly, the first and second semiconductor devices and the bus bar can be configured as an integrated unit, thus achieving reduction in size of the system.

DESCRIPTION OF EMBODIMENTS

Figure 1:
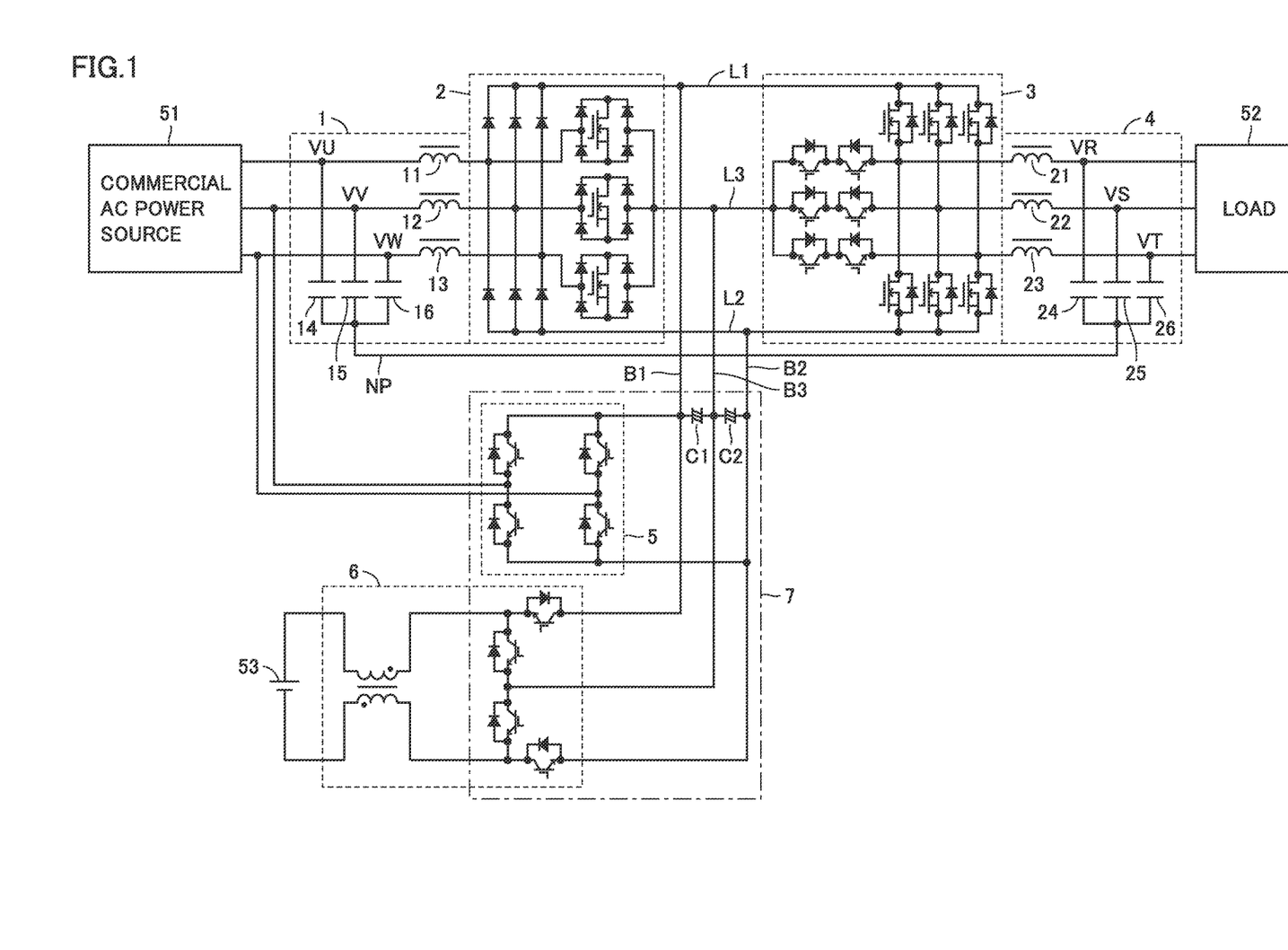
FIG. 1 is a circuit block diagram showing a configuration of an uninterruptible power supply system according one embodiment of the present invention.

FIG. 1 is a circuit block diagram showing a configuration of an uninterruptible power supply system according one embodiment of the present invention. In FIG. 1, the uninterruptible power supply system includes an input filter 1, a converter 2, a DC positive bus L1, a DC negative bus L2, a DC neutral bus L3, an inverter 3, an output filter 4, bus bars B1 to B3, smoothing capacitors C1, C2, a regenerative converter 5, and a bidirectional chopper 6.

Bus bars B1 to B3, smoothing capacitors C1, C2, semiconductor modules included in regenerative converter 5, and semiconductor modules included in bidirectional chopper 6 constitute a single converter unit 7. Note that, for simplicity of the drawing and the explanation, a control device for controlling converter 2, inverter 3, regenerative converter 5, and bidirectional chopper 6 is not shown.

Input filter 1 includes reactors 11 to 13 and capacitors 14 to 16. Each of reactors 11 to 13 has one terminal to receive a corresponding one of three-phase AC voltages VU, VV, VW having a commercial frequency supplied form a commercial AC power source 51, and has the other terminal connected to a corresponding one of three input terminals of converter 2. Each of capacitors 14 to 16 has one electrode connected to the one terminal of a corresponding one of reactors 11 to 13, and has the other electrode connected to a neutral point NP.

Reactors 11 to 13 and capacitors 14 to 16 constitute a low-pass filter. Input filter 1 allows passage of three-phase AC power from commercial AC power source 51 to converter 2, and prevents a signal having a carrier frequency generated at converter 2 from passing to the commercial AC power source 51 side.

Figure 2:
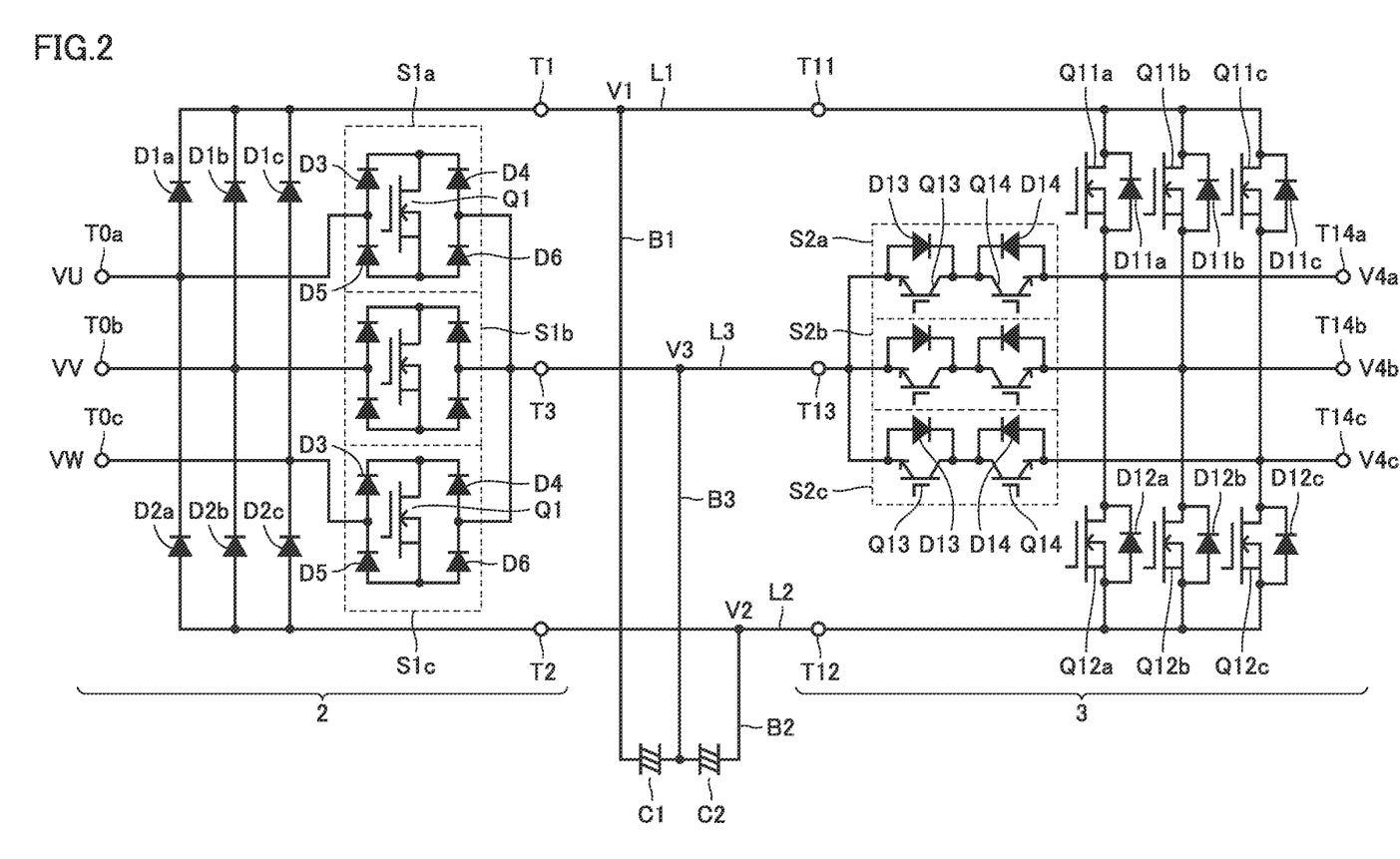
FIG. 2 is a circuit diagram showing configurations of the converter and the inverter shown in FIG. 1.

As shown in FIG. 2, converter 2 includes input terminals T0a to T0c, output terminals T1 to T3, diodes D1a to D1c, D2a to D2c, and bidirectional switches S1a to S1c. Input terminals T0a, T0b, T0c receive three-phase AC voltages VU, VV, VW, respectively, supplied from commercial AC power source 51 through input filter 1.

Diodes D1a to D1c have respective anodes connected to input terminals T0a, T0b, T0c, respectively, and have respective cathodes all connected to output terminal T1. Diodes D2a to D2c have respective anodes all connected to output terminal T2, and have respective cathodes connected to input terminals T0a to T0c, respectively.

Each of bidirectional switches S1a to S1c has one terminal connected to a corresponding one of input terminals T0a to T0c, and has the other terminal connected to output terminal T3. Each of bidirectional switches S1a to S1c includes diodes D3 to D6 and an N-channel MOS transistor Q1.

The anode of diode D3 and the cathode of diode D5 are both connected to input terminal T0a (or T0b or T0c). The anode of diode D4 and the cathode of diode D6 are both connected to output terminal T3. The cathodes of diodes D3, D4 are connected to each other, and the anodes of diodes D5, D6 are connected to each other. Transistor Q1 has a drain connected to the cathodes of diodes D3, D4, and has a source connected to the anodes of diodes D5, D6.

Input terminal T0a, output terminals T1 to T3, diodes D1a, D2a, and bidirectional switch S1a constitute a U-phase converter that converts U-phase AC voltage VU into DC voltages V1 to V3 and outputs DC voltages V1 to V3 to output terminals T1 to T3, respectively. Input terminal T0b, output terminals T1 to T3, diodes D1b, D2b, and bidirectional switch S1b constitute a V-phase converter that converts V-phase AC voltage VV into DC voltages V1 to V3 and outputs DC voltages V1 to V3 to output terminals T1 to T3, respectively.

Input terminal T0c, output terminals T1 to T3, diodes D1c, D2c, and bidirectional switch S1c constitute a W-phase converter that converts W-phase AC voltage VW into DC voltages V1 to V3 and outputs DC voltages V1 to V3 to output terminals T1 to T3, respectively. Converter 2 converts three-phase AC voltages VU, VV, VW into DC voltages V1 to V3 and outputs DC voltages V1 to V3 to output terminals T1 to T3, respectively.

Going into the details, transistors Q1 of bidirectional switches S1a, S1b, S1c are controlled by pulse width modulation (PWM) signals Φ1a, Φ1b, Φ1c, respectively, from the control device (not shown). The phases of PWM signals Φ1a, Φ1b, Φ1c are in synchronization with the phases of three-phase AC voltages VU, VV, VW, respectively, and are shifted by 120° from each other.

Figure 3:
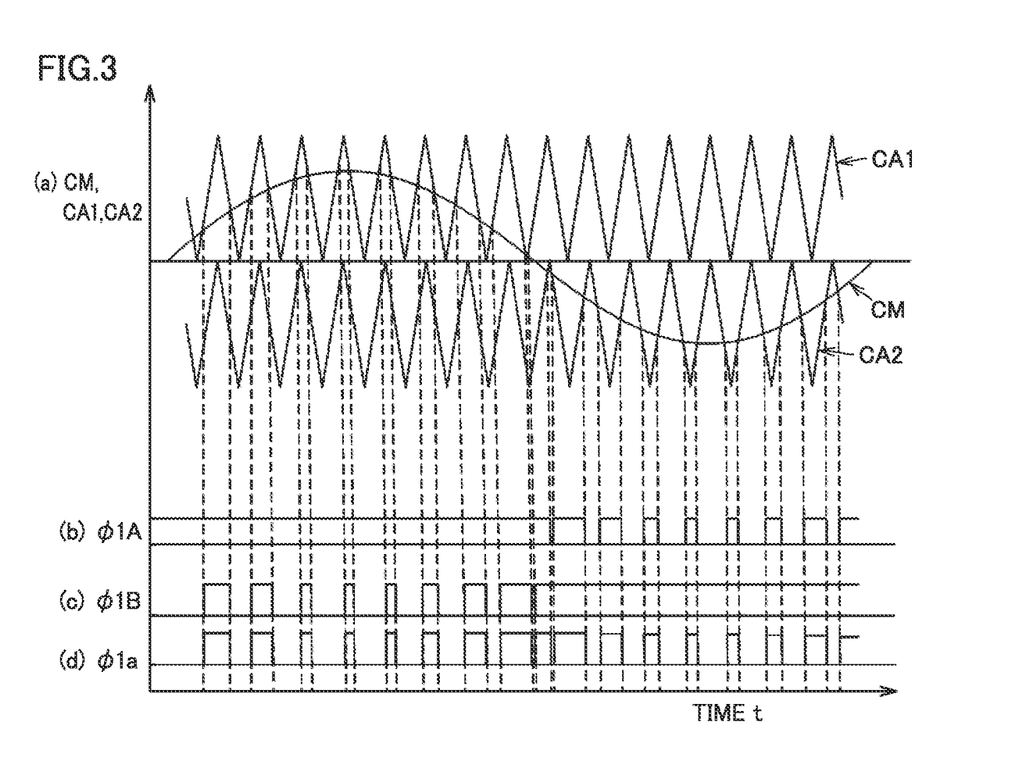
FIG. 3 is a time chart for illustrating a method of controlling the converter shown in FIG. 2.

FIG. 3(a) to (d) show a method of creating PWM signal Φ1a for the U-phase converter and its waveform. In particular, FIG. 3(a) shows the waveforms of a sinusoidal-wave instruction value signal CM, a positive-side triangle wave carrier signal CA1, and a negative-side triangle wave carrier signal CA2, and FIG. 3(b), (c), (d) show the waveforms of PWM signals Φ1A, Φ1B, Φ1a, respectively.

In FIG. 3(a) to (d), the frequency of sinusoidal-wave instruction value signal CM is, for example, a commercial frequency. Sinusoidal-wave instruction value signal CM is the same in phase as AC voltage VU having a commercial frequency, for example. Carrier signals CA1, CA2 are the same in cycle and phase. Carrier signals CA1, CA2 are sufficiently smaller in cycle than sinusoidal-wave instruction value signal CM.

The level of sinusoidal-wave instruction value signal CM and the level of positive-side triangle wave carrier signal CA1 are compared with each other. If sinusoidal-wave instruction value signal CM is higher than positive-side triangle wave carrier signal CA1 in level, PWM signal Φ1B is set to the "L" level. If sinusoidal-wave instruction value signal CM is lower than positive-side triangle wave carrier signal CA1 in level, PWM signal Φ1B is set to the "H" level.

Accordingly, during a period in which the level of sinusoidal-wave instruction value signal CM is positive, PWM signal Φ1B is set to the "H" level and the "L" level in synchronization with carrier signal CA1, whereas, during a period in which the level of sinusoidal-wave instruction value signal CM is negative, PWM signal Φ1B is fixed to the "H" level.

The level of sinusoidal-wave instruction value signal CM and the level of negative-side triangle wave carrier signal CA2 are compared with each other. If sinusoidal-wave instruction value signal CM is higher than negative-side triangle wave carrier signal CA2 in level, PWM signal Φ1A is set to the "H" level. If sinusoidal-wave instruction value signal CM is lower than negative-side triangle wave carrier signal CA2 in level, PWM signal Φ1A is set to the "L" level.

Accordingly, during a period in which the level of sinusoidal-wave instruction value signal CM is positive, PWM signal Φ1A is fixed to the "H" level. During a period in which the level of sinusoidal-wave instruction value signal CM is negative, PWM signal Φ1A is set to the "H" level and the "L" level in synchronization with carrier signal CA2. PWM signal Φ1a is a signal of the logical AND of PWM signals Φ1A, Φ1B. PWM signal Φ1a is set to the "H" level and the "L" level in synchronization with carrier signals CA1, CA2.

The ratio of the length of time for which a PWM signal is at the "H" level within one cycle to the length of time of one cycle of the PWM signal is called a duty cycle. During a period in which the level of sinusoidal-wave instruction value signal CM is positive, the duty cycle of PWM signal Φ1a is the smallest at around the positive peak (90°) of sinusoidal-wave instruction value signal CM, increases with the distance from the peak, and is the largest at around 0° and 180°. During a period in which the level of sinusoidal-wave instruction value signal CM is negative, the duty cycle of PWM signal Φ1a is the smallest at around the negative peak (270°) of sinusoidal-wave instruction value signal CM, increases with the distance from the peak, and is the largest at around 180° and 360°.

Next, a current flowing through diodes D1a, D2a, D3 to D6 and transistor Q1 of the U-phase converter is described. Suppose that the power factor is 1.0 and that the phase of sinusoidal-wave instruction value signal CM coincides with the phase of AC voltage VU. During a period in which the level of sinusoidal-wave instruction value signal CM is positive, when transistor Q1 is OFF, a current I1 at a level corresponding to the level of AC voltage VU flows from input terminal T0a to output terminal T1 through diode D1a; whereas, when transistor Q1 is ON, a current I1A at a level complementing current I1 flows from input terminal T0a to output terminal T3 through diode D3, transistor Q1, and diode D6.

During a period in which the level of sinusoidal-wave instruction value signal CM is negative, when transistor Q1 is OFF, a current I2 at a level corresponding to the level of AC voltage VU flows from output terminal T2 to input terminal T0a through diode D2a; whereas, when transistor Q1 is ON, a current I2A at a level complementing current I2 flows from output terminal T3 to input terminal T0a through diode D4, transistor Q1, and diode D5. The V-phase converter and the W-phase converter are similar to the U-phase converter, and thus the explanation thereof is not repeated.

During a normal time when three-phase AC power is normally supplied from commercial AC power source 51, converter 2 converts three-phase AC power supplied from commercial AC power source 51 through input filter 1 into DC power, so that the DC power is supplied to a battery 53 (power storage device) through bidirectional chopper 6 and is also supplied to inverter 3. Battery 53 stores DC power. A capacitor may be connected instead of battery 53.

In other words, converter 2 is controlled by PWM signals Φ1a, Φ1b, Φ1c provided from the control device (not shown), generates DC voltages V1 to V3 based on three-phase AC voltages VU, VV, VW supplied from commercial AC power source 51 through input filter 1, and provides the generated DC voltages V1 to V3 to output terminals T1 to T3, respectively.

DC voltage V1 is a voltage higher than DC voltage V2. DC voltage V3 is an intermediate voltage between DC voltage V1 and DC voltage V2. If output terminal T3 is grounded, DC voltages V1, V2, V3 are a positive voltage, a negative voltage, and 0 V, respectively. During a power failure time when supply of AC power from commercial AC power source 51 is stopped, transistors Q1 are fixed to an off-state and the operation of converter 2 is stopped.

Note that converter 2 cannot return power from the side of output terminals T1 to T3 to the side of input terminals T0a to T0c. Accordingly, the uninterruptible power supply system is additionally provided with regenerative converter 5 for returning power from the side of output terminals T1 to T3 to the side of input terminals T0a to T0c as needed. At the same time, the control of converter 2 is simplified compared to a converter of a type that can perform both supply of power and regeneration of power.

As shown in FIG. 2, each of DC positive bus L1, DC negative bus L2, and DC neutral bus L3 has one terminal connected to a corresponding one of output terminals T1 to T3 of converter 2, and has the other terminal connected to a corresponding one of input terminals T11 to T13 of inverter 3.

Inverter 3 includes input terminals T11 to T13, output terminals T14a to T14c, N-channel MOS transistors Q11a to Q11c, Q12a to Q12c, diodes D11a to D11c, D12a to D12c, and bidirectional switches S2a to S2c.

Transistors Q11a to Q11c have respective drains all connected to input terminal T11, and have respective sources connected to output terminals T14a to T14c, respectively. Transistors Q12a to Q12c have respective drains connected to output terminals T14a to T14c, respectively, and have respective sources all connected to input terminal T12. Diodes D11a to D11c, D12a to D12c are connected in antiparallel to transistors Q11a to Q11c, Q12a to Q12c, respectively.

Each of bidirectional switches S2a to S2c has one terminal connected to input terminal T13, and has the other terminal connected to a corresponding one of output terminals T14a to T14c. Each of bidirectional switches S2a to S2c includes transistors Q13, Q14 and diodes D13, D14. Each of transistors Q13, Q14 is, for example, an insulated gate bipolar transistor (IGBT).

The collectors of transistors Q13, Q14 are connected to each other. The emitter of transistor Q13 is connected to input terminal T13, and the emitter of transistor Q14 is connected to output terminal T14a (or T14b or T14c) Diodes D13, D14 are connected in antiparallel to transistors Q13, Q14, respectively.

Transistors Q11a, Q11b, Q11c are controlled by PWM signals Φ11a, Φ11b, Φ11c, respectively, from the control device (not shown). The phases of PWM signals Φ11a, Φ11b, Φ11c are in synchronization with the phases of three-phase AC voltages VU, VV, VW, respectively, and are shifted by 120° from each other.

Transistors Q12a, Q12b, Q12c are controlled by PWM signals Φ12a, Φ12b, Φ12c, respectively, from the control device (not shown). The phases of PWM signals Φ12a, Φ12b, Φ12c are in synchronization with the phases of three-phase AC voltages VU, VV, VW, respectively, and are shifted by 120° from each other.

Transistors Q13 of bidirectional switches S2a, S2b, S2c are controlled by PWM signals Φ13a, Φ13b, Φ13c, respectively, from the control device (not shown). PWM signals Φ13a, Φ13b, Φ13c are complementary signals of PWM signals Φ11a, Φ11b, Φ11c, respectively.

Transistors Q14 of bidirectional switches S2a, S2b, S2c are controlled by PWM signals Φ14a, Φ14b, Φ14c, respectively, from the control device (not shown). PWM signals Φ14a, Φ14b, Φ14c are complementary signals of PWM signals Φ12a, Φ12b, Φ12c, respectively.

That is, input terminals T11 to T13, output terminal T14a, transistors Q11a, Q12a, diodes D11a, D12a, and bidirectional switch S2a constitute an R-phase inverter that converts DC voltages V1 to V3 into an AC voltage V4a and outputs it to output terminal T14a.

Input terminals T11 to T13, output terminal T14b, transistors Q11b, Q12b, diodes D11b, D12b, and bidirectional switch S2b constitute an S-phase inverter that converts DC voltages V1 to V3 into an AC voltage V4b and outputs it to output terminal T14b.

Input terminals T11 to T13, output terminal T14c, transistors Q11c, Q12c, diodes D11c, D12c, and bidirectional switch S2c constitute a T-phase inverter that converts DC voltages V1 to V3 into an AC voltage V4c and outputs it to output terminal T14c. AC voltages V4a to V4c vary in synchronization with three-phase AC voltages VU, VV, VW and have phases shifted by 120° from each other.

Figure 4:
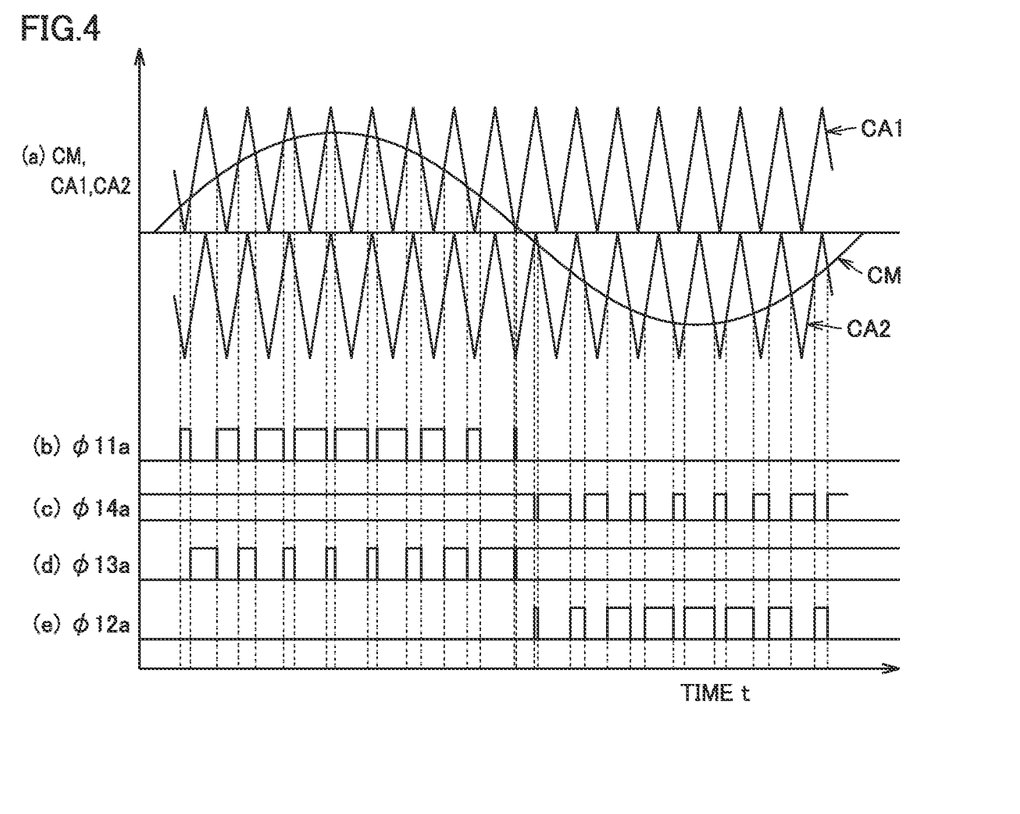
FIG. 4 is a time chart for illustrating a method of controlling the inverter shown in FIG. 2.

FIG. 4(a) to (e) show a method of creating PWM signals Φ11a to Φ14a for the R-phase inverter and their waveforms. In particular, FIG. 4(a) shows the waveforms of sinusoidal-wave instruction value signal CM, positive-side triangle wave carrier signal CA1, and negative-side triangle wave carrier signal CA2, and FIG. 4(b), (c), (d), (e) show the waveforms of PWM signals Φ11a, Φ14a, Φ13a, Φ12a, respectively.

In FIG. 4(a) to (e), the frequency of sinusoidal-wave instruction value signal CM is, for example, a commercial frequency. Carrier signals CA1, CA2 are the same in cycle and phase. Carrier signals CA1, CA2 are sufficiently smaller in cycle than sinusoidal-wave instruction value signal CM.

The level of sinusoidal-wave instruction value signal CM and the level of positive-side triangle wave carrier signal CA1 are compared with each other. If sinusoidal-wave instruction value signal CM is higher than positive-side triangle wave carrier signal CA1 in level, PWM signals Φ11a, Φ13a are set to the "H" level and the "L" level, respectively. If sinusoidal-wave instruction value signal CM is lower than positive-side triangle wave carrier signal CA1 in level, PWM signals Φ11a, Φ13a are set to the "L" level and the "H" level, respectively.

Accordingly, during a period in which the level of sinusoidal-wave instruction value signal CM is positive, PWM signals Φ11a, Φ13a are alternately set to the "H" level in synchronization with carrier signal CA1, so that transistors Q11a and Q13 are alternately turned on. During a period in which the level of sinusoidal-wave instruction value signal CM is negative, on the other hand, PWM signals Φ11a, Φ13a are fixed to the "L" level and the "H" level, respectively, so that transistor Q11a is fixed to an off-state and so that transistor Q13 is fixed to an on-state.

The level of sinusoidal-wave instruction value signal CM and the level of negative-side triangle wave carrier signal CA2 are compared with each other. If sinusoidal-wave instruction value signal CM is higher than negative-side triangle wave carrier signal CA2 in level, PWM signals Φ12a, Φ14a are set to the "L" level and the "H" level, respectively. If sinusoidal-wave instruction value signal CM is lower than negative-side triangle wave carrier signal CA2 in level, PWM signals Φ12a, Φ14a are set to the "H" level and the "L" level, respectively.

Accordingly, during a period in which the level of sinusoidal-wave instruction value signal CM is positive, PWM signals Φ12a, Φ14a are fixed to the "L" level and the "H" level, respectively, so that transistor Q12a is fixed to an off-state and so that transistor Q14 is fixed to an on-state. During a period in which the level of sinusoidal-wave instruction value signal CM is negative, on the other hand, PWM signals Φ12a, Φ14a are alternately set to the "H" level in synchronization with carrier signal CA2, so that transistors Q12a and Q14 are alternately turned on.

The ratio of the length of time for which a PWM signal is at the "H" level within one cycle to the length of time of one cycle of the PWM signal is called a duty cycle. During a period in which the level of sinusoidal-wave instruction value signal CM is positive, the duty cycle of PWM signal Φ11a is the largest at around the positive peak (90°) of sinusoidal-wave instruction value signal CM, decreases with the distance from the peak, and is reduced to 0 at around 0° and 180°. During a period in which the level of sinusoidal-wave instruction value signal CM is negative, the duty cycle of PWM signal Φ11a is fixed to 0. PWM signal Φ13a is a complementary signal of PWM signal Φ11a.

During a period in which the level of sinusoidal-wave instruction value signal CM is positive, the duty cycle of PWM signal Φ12a is fixed to 0. The duty cycle of PWM signal Φ12a is the largest at around the negative peak (270°) of sinusoidal-wave instruction value signal CM, decreases with the distance from the peak, and is reduced to 0 at around 180° and 360°. During a period in which the level of sinusoidal-wave instruction value signal CM is positive, the duty cycle of PWM signal Φ12a is fixed to 0. PWM signal Φ14a is a complementary signal of PWM signal Φ12a.

PWM signals Φ11b to Φ14b for the S-phase inverter and PWM signals Φ11c to Φ14c for the T-phase inverter are similar to PWM signals Φ11a to Φ14a for the R-phase inverter. Thus, the explanation thereof is not repeated.

Inverter 3 converts DC power generated at converter 2 into three-phase AC power during a normal time when three-phase AC power is normally supplied from commercial AC power source 51. Inverter 3 converts DC power supplied from battery 53 through bidirectional chopper 6 into three-phase AC power during a power failure time when supply of AC power from commercial AC power source 51 is stopped.

In other words, inverter 3 generates three-phase AC voltages V4a to V4c based on DC voltages V1 to V3 supplied from converter 2 through buses L1 to L3 during a normal time, and generates three-phase AC voltages V4a to V4c based on DC voltages V1 to V3 supplied from battery 53 through bidirectional chopper 6 and buses L1 to L3 during a power failure time.

Referring back to FIG. 1, output filter 4 includes reactors 21 to 23 and capacitors 24 to 26. Each of reactors 21 to 23 has one terminal connected to a corresponding one of output terminals T14a to T14c of inverter 3, and has the other terminal connected to a load 52. Each of capacitors 24 to 26 has one electrode connected to the other terminal of a corresponding one of reactors 21 to 23, and has the other electrode connected to neutral point NP. Reactors 21 to 23 and capacitors 24 to 26 constitute a low-pass filter.

Output filter 4 allows passage of AC power having a commercial frequency, out of AC power output from inverter 3, to load 52, and prevents a signal having a carrier frequency generated at inverter 3 from passing to the load 52 side. In other words, output filter 4 converts output voltages V4a to V4c of inverter 3 into three-phase AC voltages VR, VS, VT each having a sinusoidal wave of a commercial frequency and supplies them to load 52. Load 52 is driven by three-phase AC voltages VR, VS, VT.

Each of bus bars B1 to B3 has one end connected to a corresponding one of buses L1 to L3, and has the other end connected to battery 53 through bidirectional chopper 6. Smoothing capacitor C1 is connected between bus bars B1, B3 to smooth DC voltage V1-V3 between bus bars B1, B3. Smoothing capacitor C2 is connected between bus bars B3, B2 to smooth DC voltage V3-V2 between bus bars B3, B2.

Bus bars B1, B3 are connected to commercial AC power source 51 through regenerative converter 5.

Figure 5:
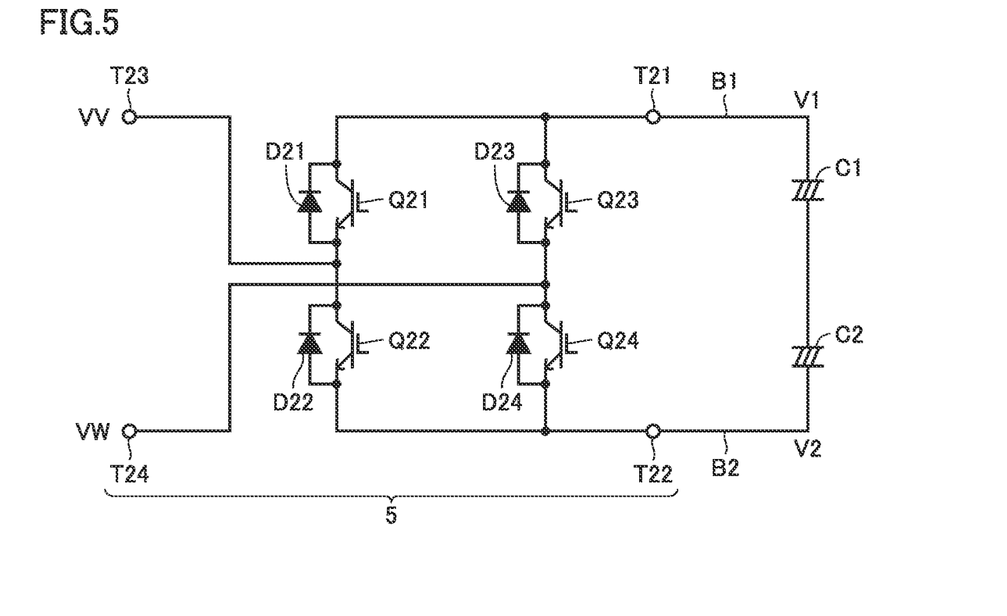
FIG. 5 is a circuit diagram showing a configuration of the regenerative converter shown in FIG. 1.

As shown in FIG. 5, regenerative converter 5 includes input terminals T21, T22, output terminals T23, T24, transistors Q21 to Q24, and diodes D21 to D24. Each of transistors Q21 to Q24 is, for example, an IGBT. Input terminals T21, T22 are connected to bus bars B1, B2, respectively. Output terminal T23 is connected to a line of V-phase AC voltage VV of commercial AC power source 51. Output terminal T24 is connected to a line of W-phase AC voltage VW of commercial AC power source 51.

Transistors Q21, Q23 have respective collectors both connected to input terminal T21, and have respective emitters connected to output terminals T23, T24, respectively. Transistors Q22, Q24 have respective collectors connected to output terminals T23, T24, respectively, and have respective emitters both connected to input terminal T22. Diodes D21 to D24 are connected in antiparallel to transistors Q21 to Q24, respectively.

Each of transistors Q21 to Q24 has a gate to receive a PWM signal from the control device (not shown). If DC voltage V1-V2 between buses L1, L2 is lower than an upper limit VH, transistors Q21 to Q24 are fixed to an off-state. If regenerative power is generated at load 52, battery 53 is in a fully charged state, and DC voltage V1-V2 between DC positive bus L1 and DC negative bus L2 exceeds upper limit VH, then each of transistors Q21 to Q24 is turned on/off with predetermined timing and DC power in smoothing capacitors C1, C2 is converted into AC power to be returned to commercial AC power source 51.

That is, when viewed from the side of input terminals T21, T22, regenerative converter 5 is an inverter that converts DC voltage V1-V2 into an AC voltage and outputs it to output terminals T23, T24. When transistors Q21, Q24 are ON and transistors Q22, Q23 are OFF, then a current flows from input terminal T21 to input terminal T22 through transistor Q21, output terminal T23, commercial AC power source 51, output terminal T24, and transistor Q24, and a positive voltage is output between output terminals T23, T24.

When transistors Q22, Q23 are ON and transistors Q21, Q24 are OFF, then a current flows from input terminal T21 to input terminal T22 through transistor Q23, output terminal T24, commercial AC power source 51, output terminal T23, and transistor Q22, and a negative voltage is output between output terminals T23, T24. Thus, by turning transistors Q21 to Q24 on/off with predetermined timing, DC voltage V1-V2 can be converted into an AC voltage to be output between output terminals T23, T24.

V-phase AC voltage VV and W-phase AC voltage VW are shifted in phase by 120° from each other, and the difference between AC voltages VV, VW is also an AC voltage VVW. By making the phase of AC voltage generated at regenerative converter 5 lead ahead of the phase of AC voltage VVW, power can be returned from the side of input terminals T21, T22 to the side of output terminals T23, T24, and thus DC voltage V1-V2 between buses L1, L2 can be reduced. If DC voltage V1-V2 between buses L1, L2 is lower than upper limit VH, then transistors Q21 to Q24 are fixed to an off-state and the return of power to commercial AC power source 51 is stopped.

Bidirectional chopper 6 supplies DC power from capacitors C1, C2 to battery 53 when three-phase AC power is being supplied from commercial AC power source 51, and supplies DC power from battery 53 to capacitors C1, C2 when supply of three-phase AC power from commercial AC power source 51 is stopped, i.e., during a power failure time.

Figure 6:
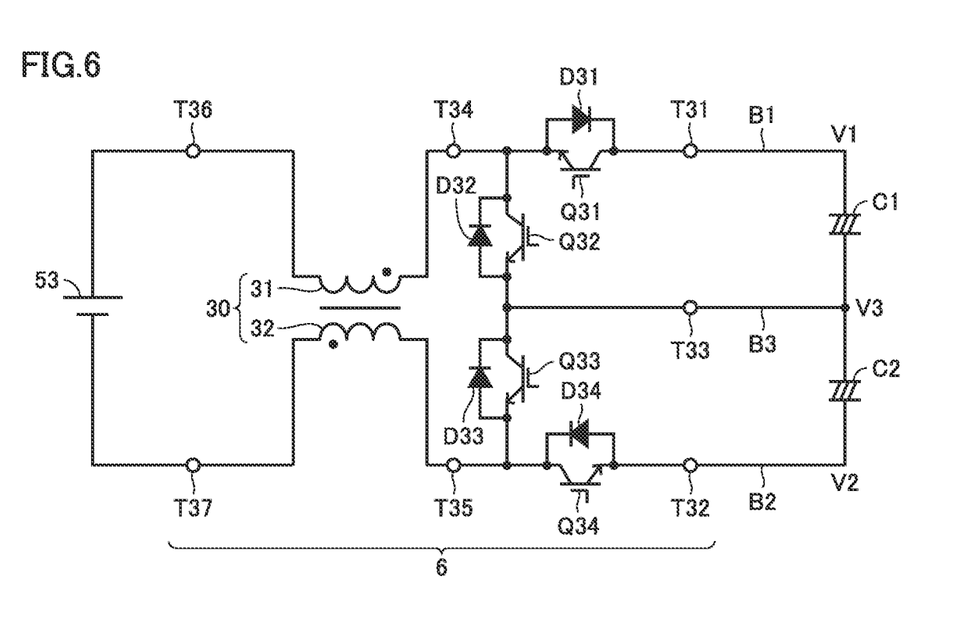
FIG. 6 is a circuit diagram showing a configuration of the bidirectional chopper shown in FIG. 1.

That is, as shown in FIG. 6, bidirectional chopper 6 includes terminals T31 to T37, transistors Q31 to Q34, diodes D31 to D34, and a normal-mode reactor (DC reactor) 30. Each of transistors Q31 to Q34 is, for example, an IGBT. Terminals T31 to T33 are connected to bus bars B1 to B3, respectively. Terminals T36 and T37 are respectively connected to the positive electrode and the negative electrode of battery 53.

Transistors Q31, Q32 have respective collectors connected to terminals T31, T34, respectively, and have respective emitters connected to terminals T34, T33, respectively. Transistors Q33, Q34 have respective collectors connected to terminals T33, T35, respectively, and have respective emitters connected to terminals T35, T32, respectively. Diodes D31 to D34 are connected in antiparallel to transistors Q31 to Q34, respectively. Normal-mode reactor 30 includes a coil 31 connected between terminals T34, T36 and a coil 32 connected between terminals T37, T35.

When three-phase AC power is being supplied from commercial AC power source 51, DC power is supplied from capacitors C1, C2 to battery 53 through bidirectional chopper 6, so that battery 53 is charged. In this case, transistors Q32, Q33 are fixed to an off-state, and transistors Q31, Q34 are alternately turned on.

That is, in a first battery charging mode, transistors Q32 to Q34 are OFF and transistor Q31 is ON. This allows a flow of current from terminal T31 to terminal T33 through transistor Q31, coil 31, battery 53, coil 32, and diode D33, with capacitor C1 being discharged and with battery 53 being charged.

Further, in a second battery charging mode, transistors Q32, Q33 are OFF and transistors Q31, Q34 are ON. This allows a flow of current from terminal T31 to terminal T32 through transistor Q31, coil 31, battery 53, coil 32, and transistor Q34, with capacitors C1, C2 being discharged and with battery 53 being charged.

In a third battery charging mode, transistors Q31 to Q33 are OFF and transistor Q34 is ON. This allows a flow of current from terminal T33 to terminal T32 through diode D32, coil 31, battery 53, coil 32, and transistor Q34, with capacitor C2 being discharged and with battery 53 being charged.

The first battery charging mode and the third battery charging mode are alternately performed. During a period between the first battery charging mode and the third battery charging mode, electromagnetic energy stored in coils 31, 32 is discharged, a current flows through diode D32, coil 31, battery 53, coil 32, and diode D33, and battery 53 is charged. The second battery charging mode is a mode where the first battery charging mode and the third battery charging mode overlap each other.

When supply of three-phase AC power from commercial AC power source 51 is stopped, DC power is supplied from battery 53 to capacitors C1, C2 through bidirectional chopper 6, so that capacitors C1, C2 are charged. In this case, transistors Q31, Q34 are fixed to an off-state, and transistors Q32, Q33 are alternately turned on.

That is, in a first battery discharging mode, transistors Q31, Q33, Q34 are OFF and transistor Q32 is ON. This allows a flow of current from the positive electrode of battery 53 to the negative electrode of battery 53 through coil 31, transistor Q32, capacitor C2, diode D34, and coil 32, with battery 53 being discharged and with capacitor C2 being charged.

In a second battery discharging mode, transistors Q31 to Q34 are OFF. This allows a flow of current from the positive electrode of battery 53 to the negative electrode of battery 53 through coil 31, diode D31, capacitors C1, C2, diode D34, and coil 32, with battery 53 being discharged and with capacitors C1, C2 being charged.

In a third battery discharging mode, transistors Q31, Q32, Q34 are OFF and transistor Q33 is ON. This allows a flow of current from the positive electrode of battery 53 to the negative electrode of battery 53 through coil 31, diode D31, capacitor C1, transistor Q33, and coil 32, with battery 53 being discharged and with capacitor C1 being charged.

The first battery discharging mode and the third battery discharging mode are alternately performed. During a period between the first battery discharging mode and the third battery discharging mode, the second battery discharging mode is performed if the voltage between terminals T31, T32 is lower than the voltage of battery 53.

A control device (not shown) controls converter 2, inverter 3, regenerative converter 5, and bidirectional chopper 6 by supplying PWM signals to them while monitoring, for example, three-phase AC voltages VU, VV, VW from commercial AC power source 51, three-phase AC voltages VR, VS, VT output to load 52, DC voltages V1 to V3, and a voltage between the terminals of battery 53.

Next, the behavior of this uninterruptible power supply system is described. During a normal time when three-phase AC power is normally supplied from commercial AC power source 51, AC power from commercial AC power source 51 is supplied to converter 2 through input filter 1 to be converted into DC power by converter 2. The DC power generated at converter 2 is stored in battery 53 through bidirectional chopper 6 and is also supplied to inverter 3 to be converted into three-phase AC power having a commercial frequency by inverter 3. The three-phase AC power generated at inverter 3 is supplied to load 52 through output filter 4, so that load 52 is operated.

When the power being consumed at load 52 is the rated power, DC voltage V1-V2 between buses L1, L2 is maintained at a rated voltage VDC and a voltage between the terminals of battery 53 is maintained at a fixed voltage VB. If regenerative power is generated at load 52, DC voltage V1-V2 between buses L1, L2 exceeds upper limit VH that is higher than rated voltage VDC, and battery 53 is in a fully charged state, then DC power in smoothing capacitors C1, C2 is converted into AC power by regenerative converter 5 to be returned to commercial AC power source 51, and DC voltage V1-V2 between buses L1, L2 returns to rated voltage VDC.

During a power failure time when supply of AC power from commercial AC power source 51 is stopped, the operation of converter 2 is stopped and DC power in battery 53 is supplied to inverter 3 through bidirectional chopper 6 to be converted into three-phase AC power having a commercial frequency by inverter 3. The three-phase AC power generated at inverter 3 is supplied to load 52 through output filter 4, so that the operation of load 52 is continued.

Thus, in the case of a power failure, the operation of load 52 is continued as long as DC power is stored in battery 53. When supply of AC power from commercial AC power source 51 is resumed, the operation of converter 2 is resumed and DC power generated at converter 2 is supplied to battery 53 through bidirectional chopper 6 and is also supplied to inverter 3, thus restoring its former state.

Figure 7:
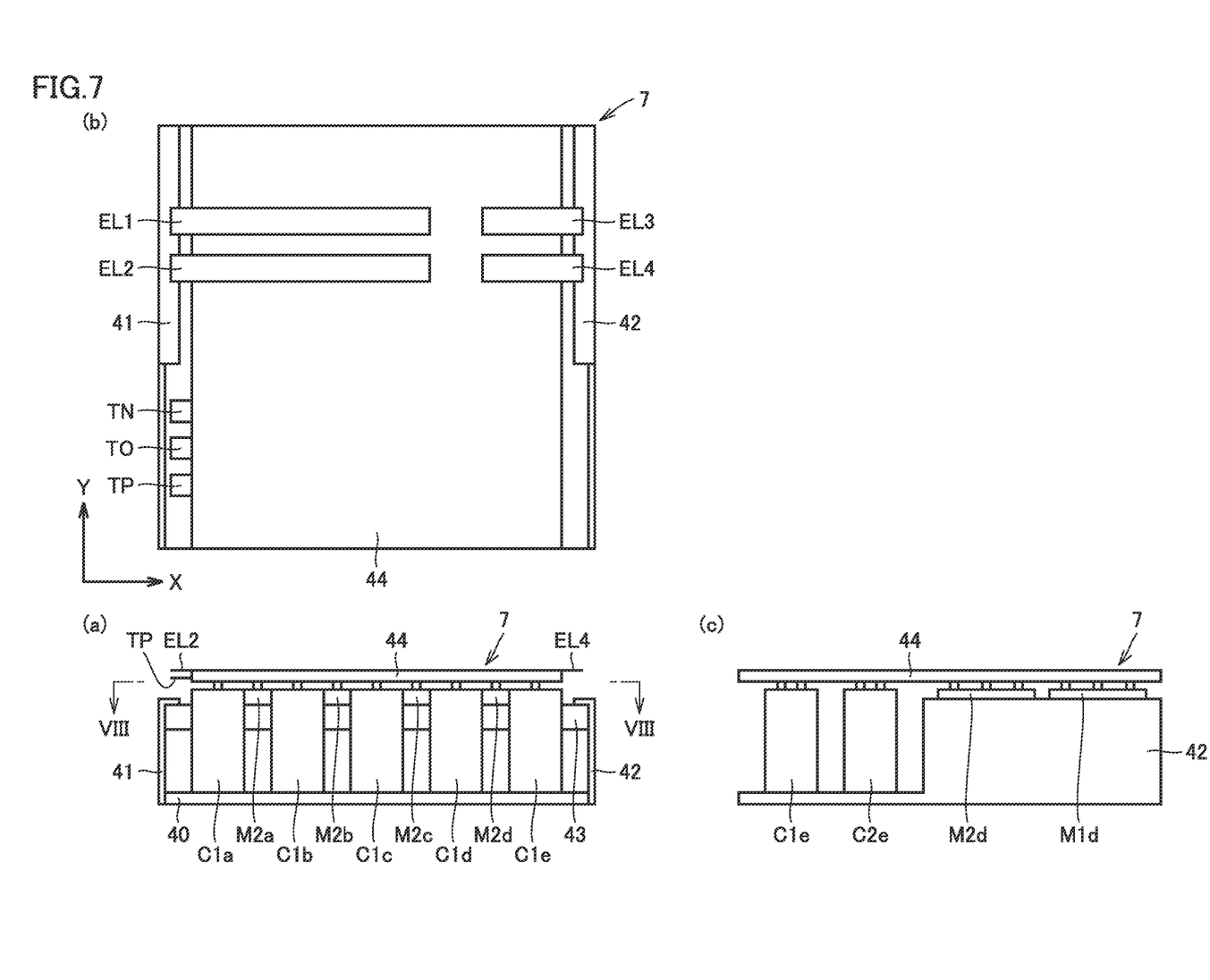
FIG. 7 is a diagram showing a configuration of the converter unit shown in FIG. 1.
Figure 8:
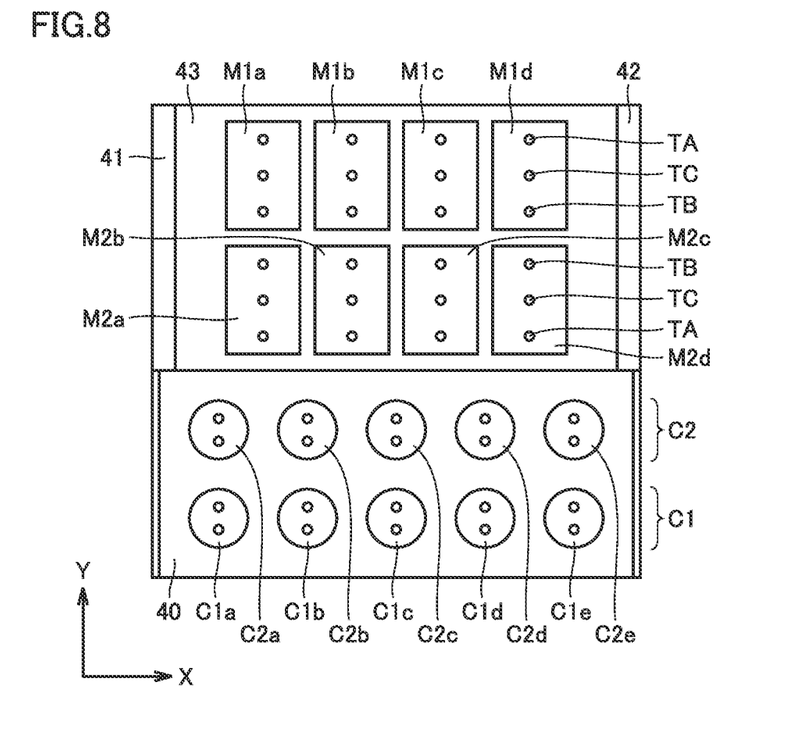
FIG. 8 is a cross-sectional view taken along the line VIII-VIII of FIG. 7.

Next, a configuration of converter unit 7 is described. FIG. 7(a), (b), (c) are a front view, a plan view, and a side view, respectively, showing a configuration of converter unit 7. FIG. 8 is a cross-sectional view taken along the line VIII-VIII of FIG. 7(a). In FIG. 7(a) to (c) and FIG. 8, converter unit 7 includes a quadrangular supporting plate 40, two side plates 41, 42, a rectangular radiator plate 43, ten capacitors C1a to C1e, C2a to C2e, eight semiconductor modules M1a to M1d, M2a to M2d, and a quadrangular laminated bus bar 44.

The width (i.e., the length in the Y direction (depth direction) in FIGS. 7 and 8) of radiator plate 43 is about half the width of supporting plate 40. The lower ends of side plates 41, 42 are fixed to side surfaces of supporting plate 40, and the upper end portions of side plates 41, 42 are bent inward. Radiator plate 43 is fixed to the lower surfaces of the bent portions of side plates 41, 42. Supporting plate 40 and radiator plate 43 are arranged in parallel to each other.

In a front-side area of a surface of supporting plate 40, ten capacitors C1a to C1e, C2a to C2e are arranged in five rows by two columns. Capacitors C1a to C1e are arranged in line in the X direction (horizontal direction) in FIGS. 7 and 8 along one side on the front side of supporting plate 40. Capacitors C1a to C1e are connected in parallel and constitute smoothing capacitor C1. Capacitors C2a to C2e are arranged in line in the X direction to be adjacent to capacitors C1a to C1e. Capacitors C2a to C2e are connected in parallel and constitute smoothing capacitor C2. Each of capacitors C1a to C1e, C2a to C2e is arranged with its two terminals being disposed at the top and being aligned in the Y direction.

At a surface of radiator plate 43, eight semiconductor modules M1a to M1d, M2a to M2d are arranged in four rows by two columns. At the lower surface of radiator plate 43, a plurality of radiator fins (not shown) are provided. The heat generated at semiconductor modules M1a to M1d, M2a to M2d is dissipated into the air through radiator plate 43.

Semiconductor modules M1a to M1d are arranged in line in the X direction along one side on the back side of radiator plate 43. Semiconductor modules M2a to M2d are arranged in line in the X direction to be adjacent to semiconductor modules M1a to M1d. Each of semiconductor modules M1a to M1d, M2a to M2d is arranged with its three terminals TA, TC, TB being disposed at the top and being aligned in the Y direction. Semiconductor modules M1a to M1d and semiconductor modules M2a to M2d are arranged oppositely. Terminal TB of each of semiconductor modules M1a to M1d is arranged to be adjacent to terminal TB of a corresponding one of semiconductor modules M2a to M2d.

Laminated bus bar 44 is arranged so as to cover capacitors C1a to C1e, C2a to C2e and semiconductor modules M1a to M1d, M2a to M2d. From the left end portion of laminated bus bar 44 in FIG. 7, three terminals TP, TO, TN protrude. Three terminals TP, TO, TN are connected to DC positive bus L1, DC neutral bus L3, and DC negative bus L2, respectively.

Further, at a surface of laminated bus bar 44, belt-shaped electrodes EL1 to EL4 extending in the X direction are provided. Electrode EL1 is provided over terminals TB of semiconductor modules M1a to M1c, and electrode EL2 is provided over terminals TB of semiconductor modules M2a to M2c. Electrode EL3 is provided over terminal TB of semiconductor module M1d, and electrode EL4 is provided over terminal TB of semiconductor module M2d.

Figure 9:
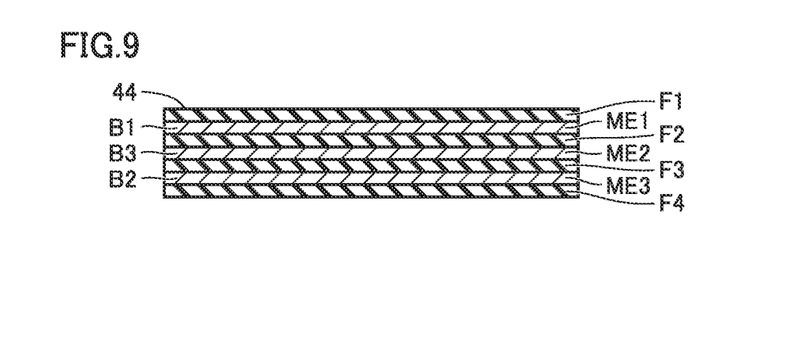
FIG. 9 is a cross-sectional view showing a configuration of the laminated bus bar shown in FIG. 7.

FIG. 9 is a cross-sectional view showing a configuration of laminated bus bar 44. In FIG. 9, laminated bus bar 44 includes laminated three conductor layers ME1 to ME3 and four insulating films F1 to F4. Three conductor layers ME1 to ME3 are provided between four insulating films F1 to F4 and are electrically insulated from one another. Three conductor layers ME1, ME2, ME3 are respectively used as bus bars B1, B3, B2, and are respectively connected to terminals TP, TO, TN.

Laminated bus bar 44 has holes corresponding to the respective terminals of capacitors C1a to C1e, C2a to C2e and semiconductor modules M1a to M1d, M2a to M2d. Each terminal is electrically connected to corresponding conductor layer ME or electrode EL through a corresponding hole by, for example, screwing or soldering. That is, capacitors C1a to C1e, C2a to C2e and semiconductor modules M1a to M1d, M2a to M2d are mounted on laminated bus bar 44. The use of laminated bus bar 44 allows reduction in inductance of each of bus bars B1 to B3, simplification in wiring, and reduction in size of the system.

Figure 10:
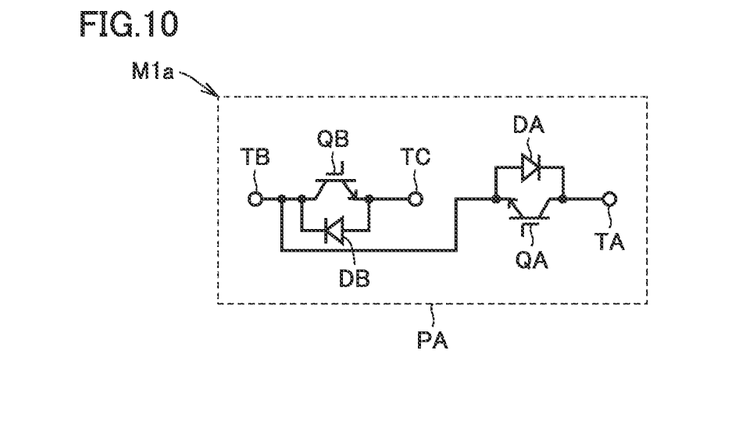
FIG. 10 is a circuit diagram showing a configuration of a semiconductor module shown in FIG. 8.

FIG. 10 is a circuit diagram showing a configuration of semiconductor module M1a. In FIG. 10, semiconductor module M1a includes two transistors QA, QB, two diodes DA, DB, three terminals TA, TB, TC, and a rectangular-parallelepiped package PA. Transistors QA, QB and diodes DA, DB are contained in package PA. Three terminals TA, TB, TC are exposed at a surface of package PA. Terminals TA, TB, TC are respectively arranged at one end portion, the other end portion, and the central portion of the surface of package PA.

Each of transistors QA, QB is, for example, an IGBT. Transistor QA has a collector and an emitter connected to terminals TA, TB, respectively. Transistor QB has a collector and an emitter connected to terminals TB, TC, respectively. Diodes DA, DB are connected in antiparallel to transistors QA, QB, respectively.

Note that, although semiconductor module M1a is additionally provided with a plurality of terminals for turning on/off transistors QA, QB, such terminals are not shown for simplicity of the drawing and the explanation. The other semiconductor modules M1b to M1d, M2a to M2d each have the same configuration as that of semiconductor module M1a.

Semiconductor modules M1a to M1c are connected in parallel and constitute transistors Q31, Q32 and diodes D31, D32 of bidirectional chopper 6 shown in FIG. 6. Semiconductor modules M2a to M2c are connected in parallel and constitute transistors Q33, Q34 and diodes D33, D34 of bidirectional chopper 6 shown in FIG. 6. Semiconductor modules M1d, M2d constitute transistors Q21, Q22 and diodes D21, D22 of regenerative converter 5 shown in FIG. 5.

Figure 11:
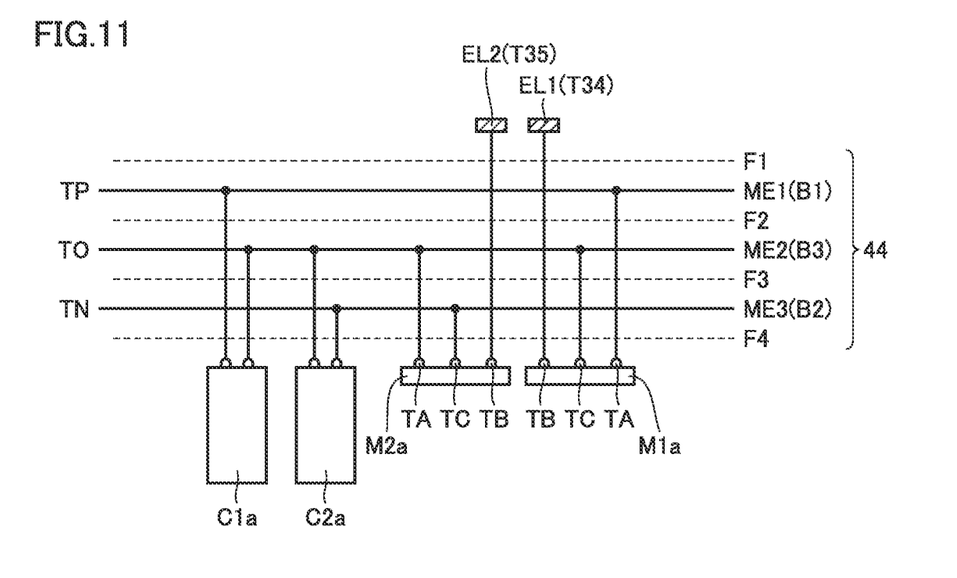
FIG. 11 schematically shows a relation of connection between a laminated bus bar, capacitors C1a, C2a, and semiconductor modules M1a, M2a shown in FIGS. 7 to 10.

FIG. 11 schematically shows a relation of connection between laminated bus bar 44, capacitors C1a, C2a, and semiconductor modules M1a, M2a. In FIG. 11, each of conductor layers ME1 to ME3 of laminated bus bar 44 is indicated by a solid line, and each of insulating films F1 to F4 is indicated by a broken line. Conductor layers ME1, ME2, ME3 respectively constitute bus bars B1, B3, B2, and are respectively connected to terminals TP, TO, TN.

Over insulating film F1, electrodes EL1, EL2 are formed and are respectively connected to terminals T34, T35 of FIG. 6. Under insulating film F4, capacitors C1a, C2a and semiconductor modules M1a, M2a are arranged. Each of the two terminals of capacitor C1a is connected to a corresponding one of conductor layers ME1, ME2. The two terminals of each of capacitors C1b to C1e are connected in a similar manner to those of capacitor C1a. Each of the two terminals of capacitor C2a is connected to a corresponding one of conductor layers ME2, ME3. The two terminals of each of capacitors C2b to C2e are connected in a similar manner to those of capacitor C2a. Each terminal of capacitor C is connected to a corresponding conductor layer ME through a hole of laminated bus bar 44.

Terminals TA, TC, TB of semiconductor module M1a are connected to conductor layers ME1, ME2 and electrode EL1, respectively. Terminals TA, TC, TB of each of semiconductor modules M1b, M1c are connected in a similar manner to those of semiconductor module M1a. Terminals TA, TC, TB of semiconductor module M2a are connected to conductor layers ME2, ME3 and electrode EL2, respectively. Terminals TA, TC, TB of each of semiconductor modules M2b, M2c are connected in a similar manner to those of semiconductor module M2a. Each terminal T of semiconductor module M is connected to a corresponding conductor layer ME or electrode EL through a hole of laminated bus bar 44. Semiconductor modules M1a to M1c, M2a to M2c constitute a second semiconductor device included in bidirectional chopper 6.

Figure 12:
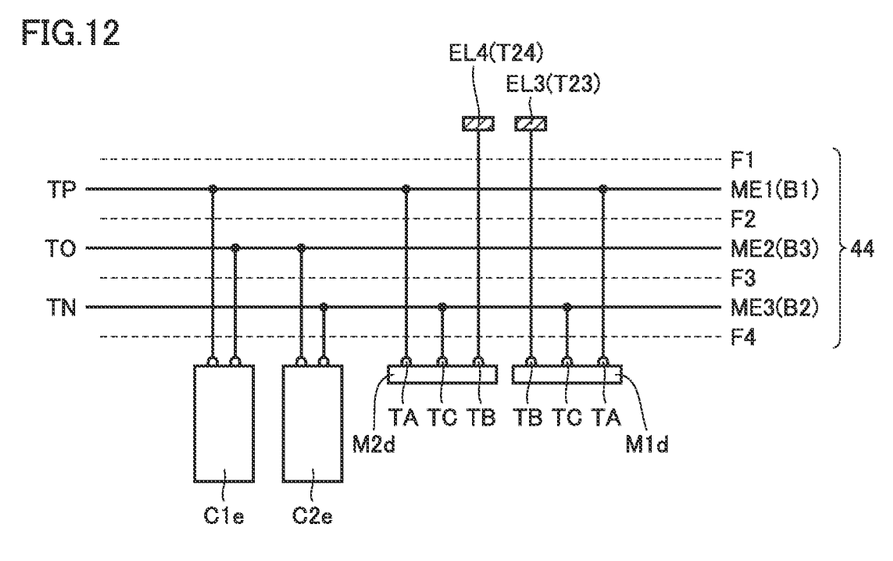
FIG. 12 schematically shows a relation of connection between a laminated bus bar, capacitors C1e, C2e, and semiconductor modules M1d, M2d shown in FIGS. 7 to 10.

FIG. 12 schematically shows a relation of connection between laminated bus bar 44, capacitors C1e, C2e, and semiconductor modules M1d, M2d. In FIG. 12, each of conductor layers ME1 to ME3 of laminated bus bar 44 is indicated by a solid line, and each of insulating films F1 to F4 is indicated by a broken line. Conductor layers ME1, ME2, ME3 respectively constitute bus bars B1, B3, B2, and are respectively connected to terminals TP, TO, TN.

Over insulating film F1, electrodes EL3, EL4 are formed and are respectively connected to terminals T23, T24 of FIG. 5. Under insulating film F4, capacitors C1e, C2e and semiconductor modules M1d, M2d are arranged. The two terminals of capacitor C1e are connected in a similar manner to those of capacitor C1a as described above. The two terminals of capacitor C2e are connected in a similar manner to those of capacitor C2a as described above.

Terminals TA, TC, TB of semiconductor module M1d are connected to conductor layers ME1, ME3 and electrode EL3, respectively. Terminals TA, TC, TB of semiconductor module M2d are connected to conductor layers ME1, ME3 and electrode EL4, respectively. Each terminal T of semiconductor module M is connected to a corresponding conductor layer ME or electrode EL through a hole of laminated bus bar 44. Semiconductor modules M1d, M2d constitute a first semiconductor device included in regenerative converter 5.

In this embodiment, converter 2 for generating a DC voltage and converter 5 for regenerating power are separately provided, thus achieving simplification of the control. Further, buses L1 to L3 are connected to regenerative converter 5 and to bidirectional chopper 6 with bus bars B1 to B3; bus bars B1 to B3 are formed into laminated bus bar 44; and semiconductor modules M1a to M1d, M2a to M2d included in regenerative converter 5 and in bidirectional chopper 6 are each mounted on laminated bus bar 44, with each terminal being connected to bus bar B1, B2, or B3. Accordingly, semiconductor modules M1a to M1d, M2a to M2d and bus bars B1 to B3 can be configured as an integrated unit, thus achieving reduction in size of the system.

In this embodiment, a case has been explained in which the present invention is applied to a three-level uninterruptible power supply system including three buses L1 to L3. The present invention, however, is not limited to such a case but may also be applied to a two-level uninterruptible power supply system including only two buses L1, L2. A two-level uninterruptible power supply system is provided with: a converter for converting an AC voltage supplied from commercial AC power source 51 into DC voltages V1, V2; an inverter for converting DC voltages V1, V2 into an AC voltage to supply the AC voltage to load 52; two bus bars B1, B2 for transmitting DC voltages V1, V2; a smoothing capacitor connected between bus bars B1, B2; a regenerative converter for converting a DC voltage between bus bars B1, B2 into an AC voltage to return the AC voltage to commercial AC power source 51; and a bidirectional chopper for giving and receiving DC power to and from bus bars B1, B2 and battery 53. Bus bars B1, B2 are formed into a laminated bus bar. Semiconductor modules included in the regenerative converter, semiconductor modules included in the bidirectional chopper, and the smoothing capacitor are mounted on the laminated bus bar.

The embodiment disclosed here should be considered illustrative in all respects, not limitative. It is intended that the scope of the present invention is defined not by the above description but by the claims, and that the scope of the present invention includes all the modifications in the meaning and scope equivalent to the claims.

REFERENCE SIGNS LIST

1: input filter; 2: converter; L1: DC positive bus; L2: DC negative bus; L3: DC neutral bus; 3: inverter; 4: output filter; B1 to B3: bus bar; C1, C2: smoothing capacitor; 5: regenerative converter; 6: bidirectional chopper; 7: converter unit; 11 to 13, 21 to 23: reactor; 14 to 16, 24 to 26, C1a to C1e, C2a to C2e: capacitor; T0a to T0c, T11 to T13, T21, T22: input terminal; T1 to T3, T14a to T14c, T23, T24: output terminal; T31 to T37, TP, TN, TO, TA to TC: terminal; Q1, Q11a to Q11c, Q12a to Q12c, Q13, Q14, Q21 to Q24, Q31 to Q34, QA, QB: transistor; D1a to D1c, D2a to D2c, D3 to D6, D11a to D11c, D12a to D12c, D13, D14, D21 to D24, D31 to D34, DA, DB: diode; S1a to S1c, S2a to S2c: bidirectional switch; 30: normal-mode reactor; 31, 32: coil; 40: supporting plate; 41, 42: side plate; 43: radiator plate; M1a to M1d, M2a to M2d: semiconductor module; 44: laminated bus bar; EL1 to EL4: electrode; PA: package; 51: commercial AC power source; 52: load; 53: battery

The invention claimed is:

1. An uninterruptible power supply system comprising:
a first converter configured to convert an AC voltage supplied from an AC power source into a DC voltage;
an inverter configured to convert a DC voltage into an AC voltage and supply the AC voltage to a load;
a DC bus connected between the first converter and the inverter and configured to transmit a DC voltage;
a bus bar connected to the DC bus and configured to transmit a DC voltage;
a second converter connected to the bus bar and configured to, if a DC voltage of the DC bus exceeds an upper limit, convert a DC voltage received from the bus bar into an AC voltage and return the AC voltage to the AC power source;
a bidirectional chopper connected to the bus bar and configured to
supply a DC voltage received from the bus bar to a power storage device during a normal time when an AC voltage is supplied from the AC power source, and
supply a DC voltage of the power storage device to the inverter through the bus bar during a power failure time when supply of an AC voltage from the AC power source is stopped;
a circuit board including the bus bar; and
a smoothing capacitor mounted on the circuit board and connected to the bus bar,
the circuit board being separately provided from the first converter and the inverter,
the circuit board including a terminal connected to the DC bus,
the bus bar being directly connected to the terminal,
the second converter including a first semiconductor device,
the bidirectional chopper including a second semiconductor device and a reactor, and
each of the first and second semiconductor devices being mounted on the circuit board and connected to the bus bar,
the circuit board including a laminated bus bar,
the laminated bus bar including a plurality of conductor layers insulated from one another,
the plurality of conductor layers constituting the bus bar,
the circuit board including a structure that supports the smoothing capacitor, the first semiconductor device, and the second semiconductor device so that terminals of the smoothing capacitor, the first semiconductor device, and the second semiconductor device are on the same plane,
the laminated bus bar configured to cover the smoothing capacitor, the first semiconductor device, and the second semiconductor device.

2. The uninterruptible power supply system according to claim 1, further comprising:
a first electrode mounted on the circuit board and connected to the first semiconductor device and also connected to the AC power source; and
a second electrode mounted on the circuit board and connected to the second semiconductor device and also connected to the power storage device through the reactor.

3. The uninterruptible power supply system according to claim 1, wherein
the smoothing capacitor includes a plurality of capacitors.

4. An uninterruptible power supply system comprising:
a first converter configured to convert an AC voltage supplied from an AC power source into first, second, and third DC voltages;
an inverter configured to convert first, second, and third DC voltages into an AC voltage and supply the AC voltage to a load;
first, second, and third DC buses connected between the first converter and the inverter and configured to transmit first, second, and third DC voltages, respectively,
the first DC voltage being higher than the second DC voltage, and the third DC voltage being an intermediate voltage between the first and second DC voltages;
first, second, and third bus bars connected to the first, second, and third DC buses, respectively, and configured to transmit first, second, and third DC voltages, respectively;
a second converter connected to the first and second bus bars and configured to, if a DC voltage between the first and second DC buses exceeds an upper limit, convert a DC voltage between the first and second bus bars into an AC voltage and return the AC voltage to the AC power source;
a bidirectional chopper connected to the first, second, and third bus bars and configured to
convert first, second, and third DC voltages received from the first, second, and third bus bars into a fourth DC voltage and supply the fourth DC voltage to a power storage device, during a normal time when an AC voltage is supplied from the AC power source, and
convert a fourth DC voltage of the power storage device into first, second, and third DC voltages and supply the first, second, and third DC voltages to the inverter through the first, second, and third bus bars, during a power failure time when supply of an AC voltage from the AC power source is stopped;

a circuit board including the first, second, and third bus bars;

a first smoothing capacitor mounted on the circuit board and connected between the first and third bus bars; and a second smoothing capacitor mounted on the circuit board and connected between the third and second bus bars, the circuit board being separately provided from the first converter and the inverter, the circuit board including first, second, and third terminals connected to the first, second, and third DC buses, respectively, the first, second, and third bus bars being directly connected to the first, second, and third terminals, respectively, the second converter including a first semiconductor device, the bidirectional chopper including a second semiconductor device and a reactor, the first semiconductor device being mounted on the circuit board and connected to the first and second bus bars, and the second semiconductor device being mounted on the circuit board and connected to the first, second, and third bus bars, the circuit board including a laminated bus bar, the laminated bus bar includes first, second, and third conductor layers insulated from one another, the first, second, and third conductor layers constitute the first, second, and third bus bars, respectively, the circuit board including a structure that supports the first smoothing capacitor, the second smoothing capacitor, the first semiconductor device, and the second semiconductor device so that terminals of the first smoothing capacitor, the second smoothing capacitor, the first semiconductor device, and the second semiconductor device are on the same plane, the laminated bus bar configured to cover the first smoothing capacitor, the second smoothing capacitor, the first semiconductor device, and the second semiconductor device.

5. The uninterruptible power supply system according to claim 4, further comprising:

first and second electrodes mounted on the circuit board and connected to the first semiconductor device and also connected to the AC power source; and third and fourth electrodes mounted on the circuit board and connected to the second semiconductor device and also connected to the power storage device through the reactor.

6. The uninterruptible power supply system according to claim 4, wherein each of the first smoothing capacitor and the second smoothing capacitor includes a plurality of capacitors.

* * * * *